United States Patent
Lee et al.

(10) Patent No.: US 9,710,022 B2
(45) Date of Patent: Jul. 18, 2017

(54) COVER DEVICE AND ELECTRONIC DEVICE INCLUDING THE SAME

(71) Applicant: Samsung Electronics Co., Ltd., Gyeonggi-do (KR)

(72) Inventors: Min-Hyouk Lee, Seoul (KR); Dong-Kyun Kim, Seoul (KR); Seon-Keun Park, Seoul (KR); Jin-Ie Ryu, Seoul (KR); Ji-Young Lee, Seoul (KR); Jin-Sang Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/833,917

(22) Filed: Aug. 24, 2015

(65) Prior Publication Data

US 2016/0054759 A1 Feb. 25, 2016

(30) Foreign Application Priority Data

Aug. 22, 2014 (KR) .......................... 10-2014-0109932

(51) Int. Cl.
*H04M 1/00* (2006.01)
*G06F 1/16* (2006.01)

(52) U.S. Cl.
CPC .......... *G06F 1/1656* (2013.01); *G06F 1/1647* (2013.01); *G06F 1/1652* (2013.01); *G06F 1/1683* (2013.01); *G06F 2200/1633* (2013.01); *G06F 2200/1634* (2013.01)

(58) Field of Classification Search
CPC .... H04M 1/0206; H04M 1/021; H04M 1/022; H04B 1/3888; G06F 1/1656; G06F 1/1652; G06F 1/1683

USPC ................................... 455/575.8; 361/679.28
See application file for complete search history.

(56) References Cited

U.S. PATENT DOCUMENTS

| | | | |
|---|---|---|---|
| 6,301,098 B1 * | 10/2001 | Kim ...................... | G06F 1/1615 190/100 |
| 6,999,804 B2 | 2/2006 | Engstrom et al. | |
| 7,016,184 B1 * | 3/2006 | Oneyama .............. | G06F 1/1616 248/551 |
| 8,672,126 B2 * | 3/2014 | Rohrbach ................ | A45C 9/00 206/320 |
| 2002/0069483 A1 * | 6/2002 | Savolainen ........... | G06F 1/1616 16/308 |
| 2006/0197715 A1 * | 9/2006 | Morisawa ............. | G06F 1/1616 345/1.1 |
| 2008/0117572 A1 * | 5/2008 | Maatta .................. | G06F 1/1616 361/679.15 |

(Continued)

FOREIGN PATENT DOCUMENTS

| | | |
|---|---|---|
| JP | 2006019909 | 1/2006 |
| KR | 20020072065 | 9/2002 |

(Continued)

*Primary Examiner* — William Nealon
(74) *Attorney, Agent, or Firm* — The Farrell Law Firm, P.C.

(57) ABSTRACT

An electronic device is provided that includes a body having a first display unit. The electronic device also includes a cover device having a first cover member detachably coupled to the body, and a second cover member pivotable about the first cover member. A second display unit is fixed to and integrated with an inner surface of the second cover member. The second display unit is electrically connected to the body when the first cover member is coupled to the body.

26 Claims, 15 Drawing Sheets

(56) References Cited

U.S. PATENT DOCUMENTS

2010/0177036 A1 7/2010 Nam
2014/0049464 A1* 2/2014 Kwak .................. G06F 3/0487
                                                    345/156

FOREIGN PATENT DOCUMENTS

| KR | 1020080035907 | 4/2008 |
| KR | 1020100030970 | 3/2010 |
| KR | 101188978 | 10/2012 |
| KR | 101212133 | 12/2012 |
| KR | 101269070 | 6/2013 |
| KR | 101359267 | 1/2014 |

* cited by examiner

COVER DEVICE AND ELECTRONIC DEVICE INCLUDING THE SAME

PRIORITY

This application claims priority under 35 U.S.C. §119(a) to Korean Application Serial No. 10-2014-0109932, which was filed in the Korean Intellectual Property Office on Aug. 22, 2014, the content of which is incorporated herein by reference.

BACKGROUND

1. Field of the Invention

The present invention relates generally to a cover device and an electronic device including the same, and more particularly, to a cover device with an integrated display.

2. Description of the Related Art

Electronic devices function as important means for delivering various kinds of information to users. Electronic devices can provide various functions and programs through cover devices.

Since a display unit is generally provided on a front surface of an electronic device and outer surfaces can be scratched or damaged due to an impact while the user carries the electronic device, various cases or covers (hereinafter, generally referred to as cover devices) have been provided.

The cover devices may be classified into various types, for example, a first type in which only an outer periphery or a rear surface of an electronic device is covered, and a second type (hereinafter referred to as a flip cover) in which both front and rear surfaces of an electronic device are covered and a front cover is opened and closed only when the display unit is used.

In addition, the flip cover may be classified into two types, for example, a separate flip cover having a rear cover that covers a rear surface of an electronic device, and an integrated flip cover in which the rear cover functions as the rear surface of the electronic device.

A cover device has been developed that works with the electronic device to turn the display unit of the electronic device on and off and the front cover of the cover device is opened and closed.

SUMMARY

The present invention has been made to address at least the above problems and/or disadvantages and to provide at least he advantages described below. Accordingly, an aspect of the present invention provides a cover device that can be used as a dual display unit according to a selection of the user, and an electronic device including the same.

Another aspect of the present invention provides a cover device that, when a dual display unit is used according to a selection of the user, the displays of the dual display unit can be held with respect to each other and can be classified into a display part and an input part according to a user environment, and an electronic device including the same.

An additional aspect of the present invention provides a cover device that can be conveniently used while in-use patterns are diversified, and an electronic device including the same.

In accordance with an aspect of the present disclosure, a cover device is provided that includes a first cover member detachably coupled to a body of an electronic device. The cover device also includes a second cover member pivotally connected to the first cover member and having a display unit on an inner surface thereof. The cover device further includes a connection member pivotally connecting the first cover member and the second cover member, and having a connection substrate electrically connecting the electronic device and the display unit.

In accordance with an aspect of the present disclosure, a cover device is provided that includes a first cover member detachably provided on a first surface of a body of an electronic device. The cover device also includes a second cover member pivotally connected to the first cover member, having a display unit fixed to and integrated with an inner surface thereof, and configured to removably cover a main display unit of the body of the electronic device. The cover device additionally includes a connection member connecting the first cover member and the second cover member such that the second cover member is pivotable about the first cover member, and on which a connection substrate electrically connecting the display unit to the electronic device is mounted. The cover device further includes a shape memory member mounted on the connection member, for holding the first cover member at an inclined position with respect to the second cover member.

In accordance with another aspect of the present disclosure, an electronic device is provided that includes a body having a first display unit. The electronic device also includes a cover device having a first cover member detachably coupled to the body, and a second cover member pivotable about the first cover member. A second display unit is fixed to and integrated with an inner surface of the second cover member. The second display unit is electrically connected to the body when the first cover member is coupled to the body.

In accordance with another aspect of the present disclosure, an electronic device is provided that includes a body having a first display unit on a first surface thereof. The electronic device also includes a first cover device coupled to a second surface of the body, for covering the body. The electronic device additionally includes a second cover device being compatible with the first cover device, for covering the body of the electronic device. The second cover device includes a first cover member detachably coupled to the second surface of the body. The second cover device also includes a second cover member pivotally coupled to the first cover member, for opening and closing the second cover device over the first surface of the body, wherein a second display unit is integrally fixed to an inner surface of the second cover member. The second cover device further includes a connection member pivotally connecting the first cover member and the second cover member.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Figure 1:
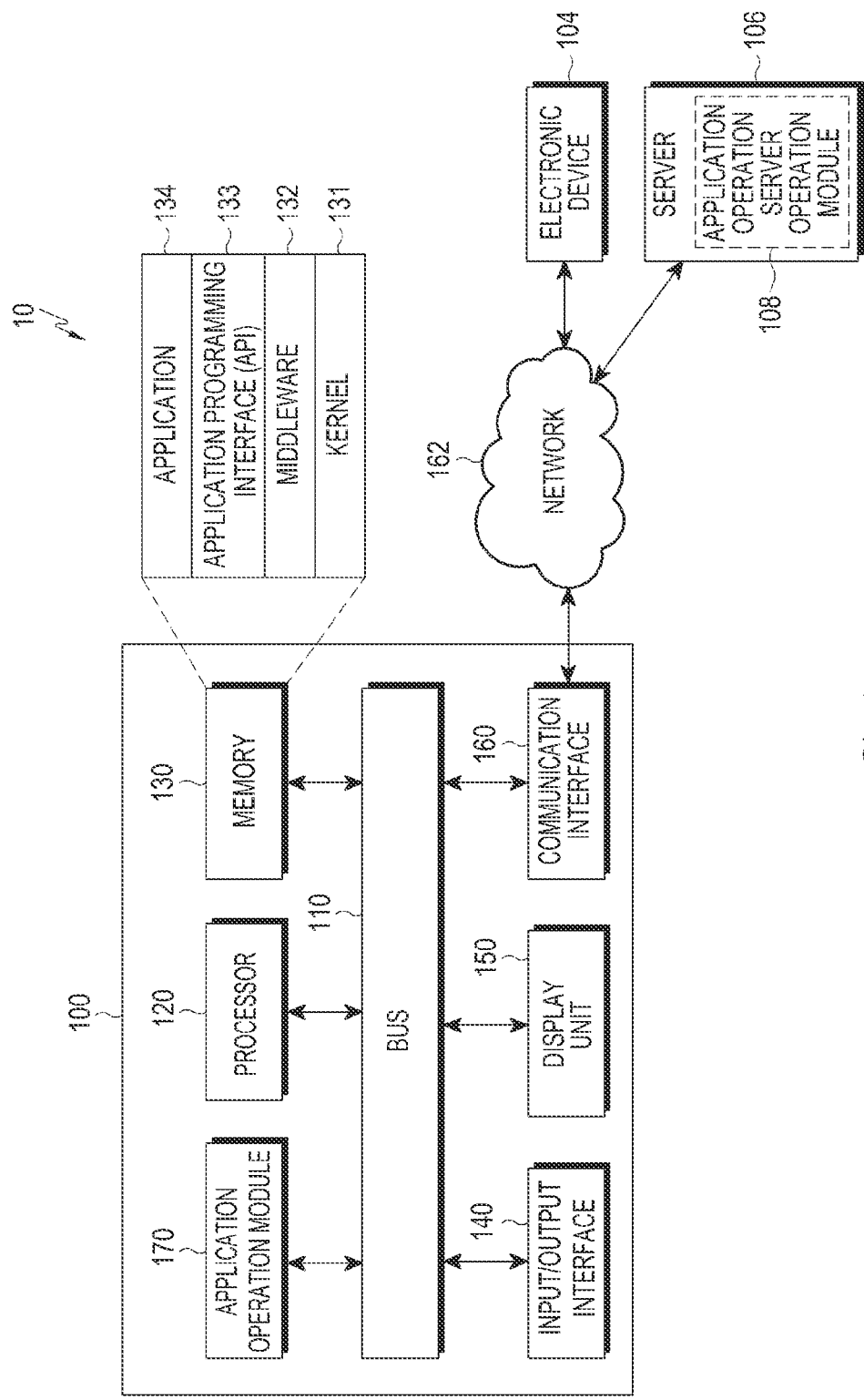
FIG. 1 is a diagram illustrating an electronic device in a network environment, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although terms including an ordinal number such as, for example, first, second, etc., can be used for describing various elements, the structural elements are not restricted by these terms. The terms are only used to distinguish one element from another element. For example, without departing from the scope of the present invention, a first structural element may be named a second structural element. Similarly, the second structural element also may be named the first structural element. As used herein, the term "and/or" includes any and all combinations of one or more associated items.

Relative terms, such as, for example, front surface, rear surface, upper surface, and lower surface, which are described with reference to the drawings, may be replaced by ordinal numbers such as first and second.

Herein, terms are used to describe a specific embodiment, and are not intended to limit the embodiments of the present invention. For example, singular forms are intended to include plural forms as well, unless the context clearly indicates otherwise. It should be understood that the term "include" or "have" indicates the existence of a feature, a number, a step, an operation, a structural element, parts, or a combination thereof, and does not exclude the existence or probability of one or more additional features, numeral, steps, operations, structural elements, parts, or combinations thereof.

Unless defined differently, all terms used herein, which include technical terminologies or scientific terminologies, have the same meanings as those understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined herein. In some cases, a term defined herein should not be interpreted to exclude other embodiments of the present invention.

In the embodiments of the present invention, an electronic device may be embodied as one or more various devices including, for example, a display, and the electronic device may be referred to as a terminal, a portable terminal, a mobile terminal, a communication terminal, a portable communication terminal, a portable mobile terminal, a display device, or the like.

For example, the electronic device may be a smartphone, a portable phone, a game player, a television (TV), a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal that has a wireless communication function and a pocket size. Further, the electronic device may be a flexible device or a flexible display device.

The electronic device may communicate with an external electronic device, such as, for example, a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Referring initially to FIG. 1, a diagram illustrates an electronic device in a network environment, according to an embodiment of the present invention.

Referring to FIG. 1, the electronic device 100 includes a bus 110, a processor 120, a memory 130, an input/output interface 140, a display unit 150, and a communication interface 160. In some embodiments of the present invention, the electronic device 100 includes an application operation module 170.

The bus 110 may be a circuit that interconnects the above-described elements and delivers communications (for example, a control message and/or data) between the above-described elements.

The processor 120 may include one or more of a Central Processing Unit (CPU), an Application Processor (AP), and a Communication Processor (CP). For example, the processor 120 may receive instructions from the aforementioned other elements (e.g., the memory 130, the input/output interface 140, the display unit 150, the communication interface 160, and the application operation module 170) through the bus 110, decipher the received instructions, and perform a calculation or data processing according to the deciphered instructions.

The memory 130 may include a volatile memory and/or a non-volatile memory. The memory 130 may store instructions or data received from the processor 120 or other elements (for example, the input/output interface 140, the display 150, the communication interface 160, the application operation module 170, or the like) or generated by the processor 120 or other elements. The memory 130 includes a kernel 131, middleware 132, an Application Programming Interface (API) 133, and an application 134. At least one of the kernel 131, the middleware 132, and the API 133 may be referred to as an Operating System (OS). The aforementioned programming modules may be formed of software, firmware, hardware, or a combination of two or more thereof.

The kernel 131 may control or manage system resources (for example, the bus 110, the processor 120, or the memory 130), which are used in performing operations or functions implemented by the remaining programming modules, for example, the middleware 132, the API 133, or the application 134. The kernel 131 may provide an interface through which the middleware 132, the API 133, and the application 134 may access individual element elements of the electronic device 100 to control or manage them.

The middleware 132 may serve as an intermediary such that the API 133 or the application 134 communicate with the kernel 131 to transmit/receive data. In relation to requests for operation received from the applications 134, the middleware 132 may control (for example, scheduling or load-balancing) the requests using, for example, a method of assigning at least one application among the applications 134 with priorities for using system resources (for example, the bus 110, the processor 120, or the memory 130) of the electronic device 100, or the like.

The API 133 is an interface by which the application 134 controls functions provided from the kernel 131 or the middleware 132, and may include, for example, at least one interface or function (for example, instructions) for file control, window control, image processing, or text control.

According to an embodiment of the present invention, the application 134 may include, for example, a Short Message Service (SMS)/Multimedia Messaging Service (MMS) application, an email application, a calendar application, an alarm application, a health care application (for example, an application for measuring a quantity of exercise, blood sugar or the like), or an environment information application (for example, an application for providing information on atmospheric pressure, humidity, or temperature). Additionally or alternately, the application 134 may be an application related to an information exchange between the electronic device 100 and an external electronic device 104. The application related to the information exchange may include, for example, a notification relay application for transmitting specific information to the external electronic device 104, or a device management application for managing the external electronic device 104.

For example, the notification relay application may include a function of transferring, to the external electronic device 104, notification information generated from other applications of the electronic device 100 (for example, an SMS/MMS application, an e-mail application, a health management application, an environmental information application, and the like). Additionally or alternatively, the notification relay application may receive notification information, for example, from the external electronic device 104 and provide the received notification information to a user. The device management application may manage (for example, install, delete, or update), for example, at least some functions (for example, turning the external electronic device 104 (or some elements) on or off, or adjusting the brightness (or resolution) of a display) of the external electronic device 104, applications performed in the external electronic device 104, or services (for example, a phone call service, or a messaging service) provided in the external electronic device 104.

According to an embodiment of the present invention, the application 134 includes applications, which are designated according to the property (for example, the type of electronic device) of the external electronic device 104. For example, when the external electronic device 104 is an MP3 player, the application 134 may include an application related to the reproduction of music. Similarly, when the external electronic device 104 is a mobile medical device, the application 134 may include an application related to the health care. According to an embodiment of the present invention, the application 134 may include at least one applications designated in the electronic device 100 or applications received from the external electronic device 104 or a server 106.

The input/output interface 140 may serve as an interface that can transmit commands or data input from the user or the external electronic device 104 to other element(s) of the electronic device 100. The input/output interface 140 may output commands or data received from other element(s) of the electronic device 100 to the user or the external electronic device 104.

The display 150 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 150 may display, for example, various types of contents (for example, text, images, videos, icons, or symbols) for users. The display 150 may include a touch screen, and may receive, for example, a touch, gesture, proximity, or hovering input by using an electronic device or a part of the user's body.

The communication interface 160 may make a communication connection between the electronic device 100 and another electronic device (for example, the external electronic device 104 or the server 106). For example, the communication interface 160 may be connected with a network 162 through wireless communication or wired communication to communicate with the external electronic device 104.

The wireless communication may include, for example, at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communication (GSM) as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include a telecommunications network, for example, at least one of a computer network (for example, LAN or WAN), Internet, and a telephone network.

According to an embodiment of the present invention, the network 162 may include at least one of a computer network, the Internet, the Internet of things, and a telephone network. According to an embodiment of the present invention, protocols (for example, a transport layer protocol, a data link layer protocol, or a physical layer protocol) for communication between the electronic device 100 and the external electronic device 104 may be supported by at least one of the application 134, the API 133, the middleware 132, the kernel 131, and the communication interface 160.

According to an embodiment of the present invention, the application operation module 170 may support driving of the electronic device 100 by performing at least one operation (or function) implemented by the electronic device 100. For example, the server 106 may include an application operation server operation module 108 for supporting the application operation module 170 implemented in the electronic device 100. For example, the application operation server operation module 108 may include at least one element of the application operation module 170, and may perform (for example, perform as a proxy) at least one of the operations performed by the application operation module 170.

The application operation module 170 may process at least some of the information obtained from other elements (for example, the processor 120, the memory 130, the input/output interface 140, or the communication interface 160) and utilize the same in various manners. For example, the application operation module 170 may control at least some functions of the electronic device 100 using the processor 120, or independently therefrom, so that the electronic device 100 may interwork with other electronic devices (for example, the external electronic device 104 or the server 106). The application operation module 170 may be integrated into the processor 120. According to an embodiment of the present invention, at least one element of the application operation module 170 may be included in the server 106 (for example, the application operation server operation module 108) and receive at least one operation, which is performed by the application operation module 170, from the server 106. The application operation module 170 is described in greater detail below with respect to FIG. 2.

Figure 2:
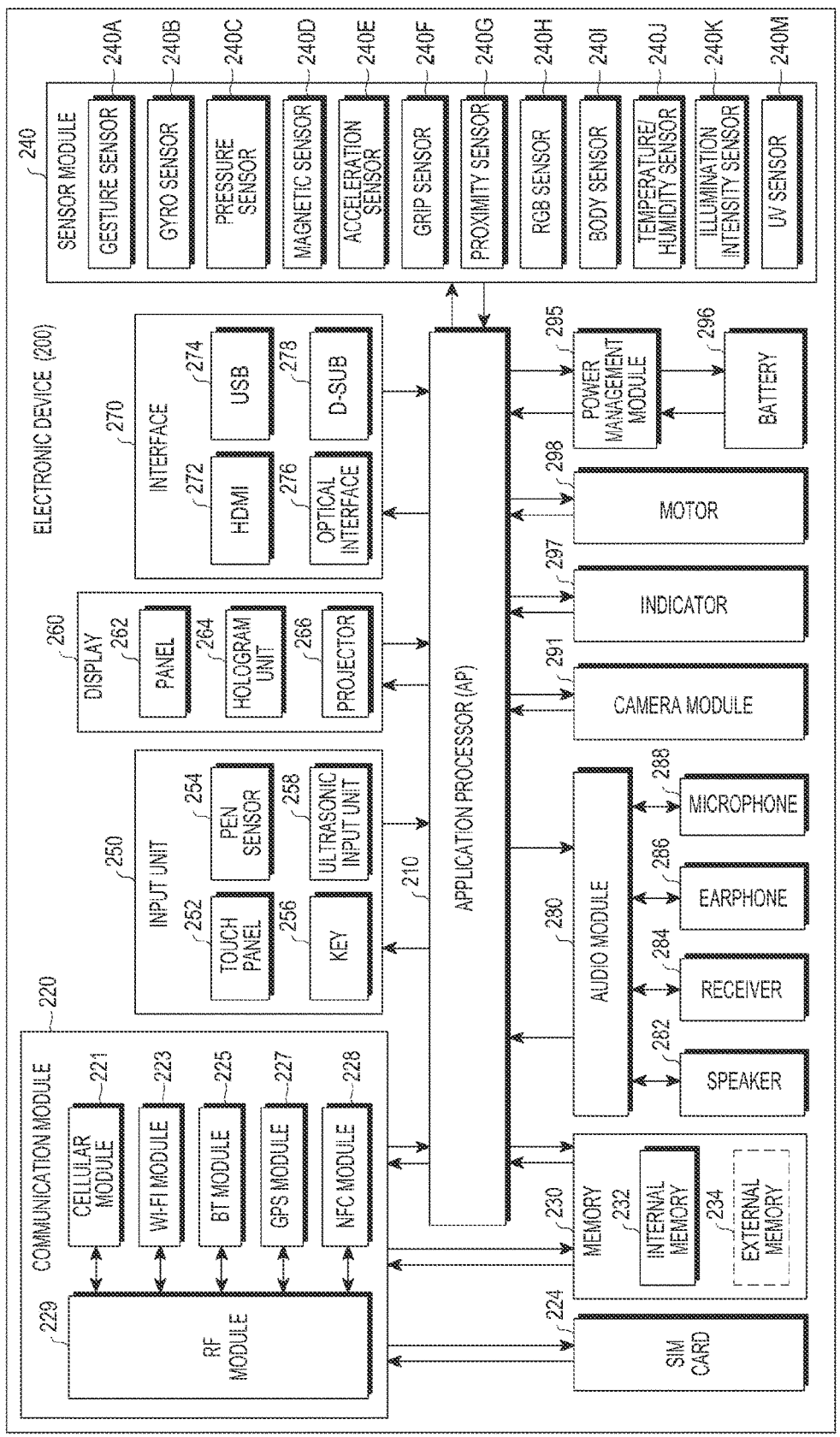
FIG. 2 is a block diagram illustrating an electronic device, according to an embodiment of the present invention.

FIG. 2 is a block diagram illustrating an electronic device, according to an embodiment of the present invention.

Referring to FIG. 2, an electronic device 200 includes, for example, all or some elements of the electronic device 100 described above with respect to FIG. 1. The electronic device 200 includes at least one of an Application Processor (AP) 210, a communication module 220, a Subscriber Identification Module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may control a plurality of hardware or software elements connected to the AP 210 by driving an operating system or an application program, may process various data including multimedia data, and may perform calculations. The AP 210 may be embodied as, for example, a System on Chip (SoC). According to an embodiment of the present invention, the AP 210 may further include a Graphic Processing Unit (GPU) and/or an image signal processor. The AP 210 may include at least some of the elements (for example, a cellular module 221) illustrated in FIG. 2. The AP 210 may load commands or data received from at least one of the other elements (for example, a non-volatile memory) in a volatile memory, process the loaded commands or data, and store various pieces of data in the non-volatile memory.

The communication module 220 (for example, the communication interface 160) may perform data transmission/reception in communication between the electronic device 200 and other electronic devices (for example, the external electronic device 104 or the server 106 illustrated in FIG. 1) connected thereto through a network. According to an embodiment of the present invention, the communication module 220 includes at least one of a cellular module 221, a Wi-Fi module 223, a BlueTooth (BT) module 225, a Global Positioning System (GPS) module 227, a Near Field Communication (NFC) module 228, and a Radio Frequency (RF) module 229.

The cellular module 221 may provide a voice call, a video call, an SMS service, an Internet service, and the like through a communication network (for example, LTE, LTE-A, CDMA, WCDMA, UMTS, WiBro, or GSM). The cellular module 221 may identify and authenticate an electronic device in a communication network, for example, using a subscriber identification module (for example, the SIM card 224). According to an embodiment of the present invention, the cellular module 221 may perform at least some functions which the AP 210 may provide. According to an embodiment, the cellular module 221 may include a Communication Processor (CP).

Each of the WiFi module 223, the BT module 225, the GPS module 227, and the NFC module 228 may include, for example, a processor for processing data transmitted/received through the corresponding module. According to an embodiment of the present invention, at least some (two or more) of the cellular module 221, the WiFi module 223, the BT module 225, the GPS module 227, and the NFC module 228 may be included in one Integrated Chip (IC) or IC package.

The RF module 229 may transmit/receive data, for example, an RF signal. The RF module 229 may include, for example, a transceiver, a Power Amp Module (PAM), a frequency filter, or a Low Noise Amplifier (LNA). The RF module 229 may include connections with an antenna. According to another embodiment of the present invention, at least one of the cellular module 221, the WiFi module 223, the BT module 225, the GPS module 227, and the NFC module 228 may transmit/receive an RF signal through a separate RF module.

The SIM card 224 may include a card including a subscriber identification module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) includes an internal memory 232 and/or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard drive, or a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 234 may be functionally and/or physically connected to the electronic device 200 through various interfaces.

The sensor module 240 may measure a physical quantity or detect an operation state of the electronic device 200, and may convert the measured or detected information to an electronic signal. The sensor module 240 includes at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a Red/Green/Blue (RGB) sensor), a biometric sensor 240I, a temperature/humidity sensor 240J, an illumination sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In an embodiment of the present invention, the electronic device 200 further includes a processor configured to control the sensor module 240 as a part of or separately from the AP 210, and may control the sensor module 240 while the AP 210 is in a sleep state.

The input device 250 includes a touch panel 252, a (digital) pen sensor 254, a key 256, and/or an ultrasonic input device 258. The touch panel 252 may recognize a touch or proximity input through at least one of, for example, a capacitive scheme, a resistive scheme, an infrared scheme, and an ultrasonic scheme. The touch panel 252 may further include a control circuit. The touch panel 252 may further include a tactile layer and provide a tactile reaction to the user.

The (digital) pen sensor 254 may include, for example, a recognition sheet which is a part of the touch panel or a separate recognition sheet. The key 256 may include, for example, a physical button, an optical key, or a keypad. The ultrasonic input device 258 may detect an acoustic wave using a microphone (for example, microphone 288) of the electronic device 200 through an input tool generating an ultrasonic signal to identify data.

The display 260 (for example, the display 150) includes a panel 262, a hologram device 264, or a projector 266. The display 260 may include a configuration that is the same as or similar to the display 150 of FIG. 1. The panel 262 may be embodied to be, for example, flexible, transparent, or wearable. The panel 262 may be also configured as a single module with the touch panel 252. The hologram device 264 may show a stereoscopic image in the air by using interference of light. The projector 266 may project light onto a screen to display an image. For example, the screen may be located inside or outside the electronic device 200. According to an embodiment of the present invention, the display 260 may further include a control circuit for controlling the panel 262, the hologram device 264, or the projector 266.

The interface 270 includes, for example, a High-Definition Multimedia Interface (HDMI) 272, a Universal Serial Bus (USB) 274, an optical interface 276, or a D-subminiature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bi-directionally convert a sound and an electronic signal. At least some elements of the audio module 280 may be included in, for example, the input/output interface 140 illustrated in FIG. 1. The audio module 280 may process sound information input or output through, for example, a speaker 282, a receiver 284, earphones 286, the microphone 288, or the like.

The camera module 291 is a device that may photograph a still image and a video. According to an embodiment of the present invention, the camera module 291 may include one or more image sensors (for example, a front sensor or a rear sensor), a lens, an Image Signal Processor (ISP) or a flash (for example, an LED or xenon lamp).

The power management module 295 may manage power of the electronic device 200. Although not illustrated, the power management module 295 may include, for example, a Power Management Integrated Circuit (PMIC), a charger Integrated Circuit (IC), or a battery or fuel gauge. The PMIC may be implemented, for example, by a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery fuel gauge may measure, for example, the remaining amount of battery or a voltage, current, or temperature during charging. The battery 296 may store or generate electricity, and may supply power to the electronic device 200 using the stored or generated electricity. The battery 296 may include, for example, a rechargeable battery or a solar battery.

The indicator 297 may indicate particular states (for example, a booting state, a message state, a charging state, etc.) of the electronic device 200 or a part (for example, the AP 210) of the electronic device 900. The motor 298 may convert an electrical signal into mechanical vibrations, and may generate a vibration or haptic effect. Although not illustrated, the electronic device 200 may include a processing unit (for example, GPU) for supporting mobile TV. The processing device for supporting mobile TV may process media data according to standards such as, for example, Digital Multimedia Broadcasting (DMB), Digital Video Broadcasting (DVB), or a media flow.

The above described components of the electronic device, according to various embodiments of the present invention, may be formed of one or more components, and a name of a corresponding component element may be changed based on the type of electronic device. The electronic device may include one or more of the aforementioned components or may further include other additional components, or some of the aforementioned components may be omitted. Further, some of the components of the electronic device may be combined to form a single entity, and thus, may equivalently execute functions of the corresponding elements prior to the combination.

The term "module", as used herein, may refer to, for example, a "unit" including one of hardware, software, and firmware, or a combination of two or more of the hardware, software, and firmware. The term "module" may be interchangeably used with a term such as unit, logic, logical block, component, or circuit. A module may be a minimum unit of an integrated component element or a part thereof. A module may be a minimum unit for performing one or more functions or a part thereof. A module may be mechanically or electronically implemented. For example, a module may include at least one of an Application-Specific Integrated Circuit (ASIC) chip, a Field-Programmable Gate Arrays (FPGAs), and a programmable-logic device for performing operations which have been known or are to be developed hereafter.

According to an embodiment of the present invention, at least a part of a device (for example, modules or functions thereof) or a method (for example, operations) may be embodied by, for example, a command stored in a computer readable storage medium in a form of a programming module. When the command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a Compact Disc Read Only Memory (CD-ROM) and a Digital Versatile Disc (DVD), magneto-optical media such as a floptical disk, and hardware devices specifically configured to store and execute program commands, such as a Read Only Memory (ROM), a Random Access Memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Figure 3:
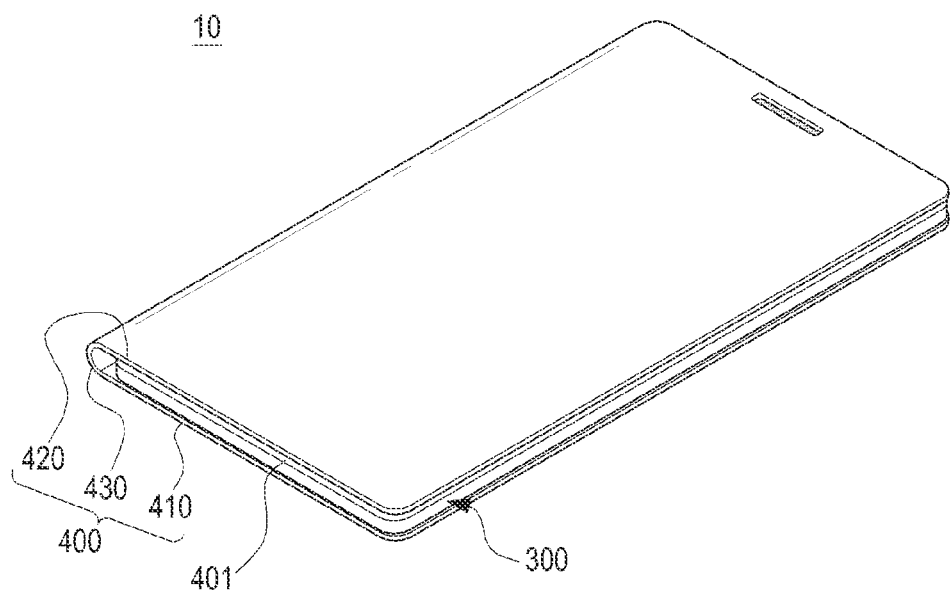
FIG. 3 is a diagram illustrating an electronic device, according to an embodiment of the present invention.
Figure 4:
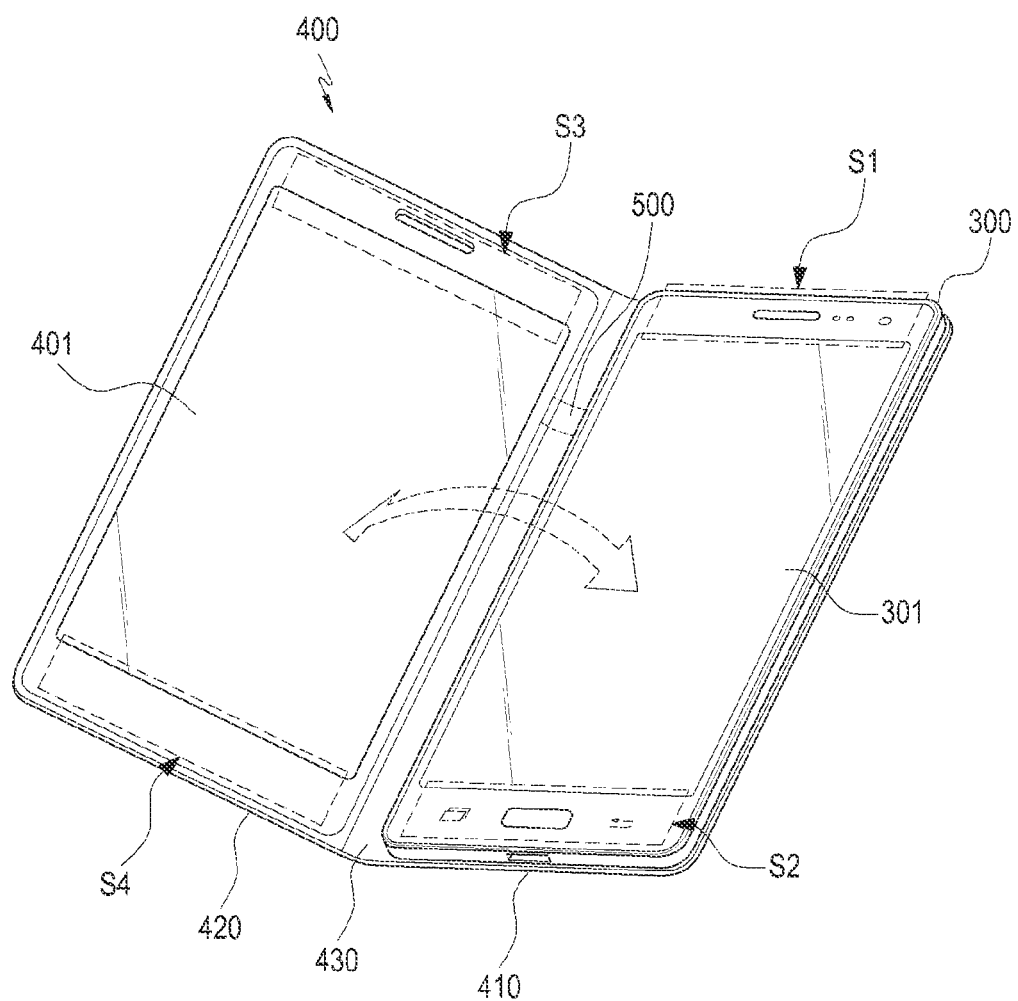
FIG. 4 is a diagram illustrating a perspective view of an electronic device, according to an embodiment of the present invention.

FIG. 3 is a diagram illustrating an electronic device, according to an embodiment of the present invention. FIG. 4 is diagram illustrating a perspective view of an electronic device, according to an embodiment of the present invention.

Referring to FIGS. 3 and 4, a combined device 10 includes an electronic device 300 and a cover device 400. According to an embodiment of the present invention, when the cover device 400 is mounted on the electronic device 300, an additional display unit that is provided in the cover device 400 may be used together with a display unit provided in the electronic device 300. Accordingly, a main display unit 301 is provided in the electronic device 300 and a separate display unit is provided in the cover device 400, so that the combined device 10 may be implemented as a dual display unit when the electronic device 300 is coupled to the cover device 400.

The combined device 10 may correspond to the electronic devices 100 and 200 or the external electronic device 104, described with reference to FIGS. 1 and 2

According to an embodiment of the present invention, the electronic device 300 may have a bar type body, a first display unit 301 on a first surface (hereinafter, referred to as a front surface) of the electronic device 300, and a rear casing 310 defining a battery mounting space 311. A printed circuit board and modules for providing various functions through the supply of electric power of a battery provided in the battery mounting space 311 may be mounted on an inner surface of the electronic device 300. For example, various modules such as a communication module, a transceiver module, a multimedia module, a camera module, an acoustic module, a detection module, and a connector module connected to an external device may be provided, and a controller 350 may control the modules (see FIG. 11). As described in greater detail below, the controller 350 may control the combined device 10 in a single display driving mode M1 and a dual display driving mode M2 when the cover 400 is mounted to the electronic device 300. When the cover 400 is mounted on the electronic device 300 such that the combined device 10 is implemented in the dual display driving mode M2, the first display unit 301 and a second display unit 401, which is described in greater detail below, may be executed in different user environments.

As described above with reference to FIGS. 1 and 2, the first display unit 301 is provided on a front surface of the electronic device 300 such that an input may be implemented according to a contact or proximity of an object, and may display an image according to the user environment. The first display unit 301 may display an input of an object such as a hand having an electric charge, or an input unit such a stylus pen or an electric pen, and an output according to the input. The first display unit 301 may receive a continuous motion of any of one or more contacts. In an embodiment of the present invention, a contact is not limited to a direct contact of the first display unit 301 with the body of the user or the input unit, and may include a noncontact, for example, a proximity. An interval that may be detected in the first display unit 301 may be changed according to a performance or structure of the electronic device 300.

According to an embodiment of the present invention, the first display unit 301 may include a touch panel and a display panel to implement inputs and outputs.

The first display unit 301 may include a configuration that is the same as or similar to the display 150 of FIG. 1. The display panel is a configuration that may display various images according to various operational states implemented by the electronic device 300, execution of applications, and services.

In an embodiment of the present invention, the touch panel may be a capacitive touch panel, an electromagnetic resonance type touch panel, a resistive touch panel, an infrared touch panel, an electromagnetic induction type touch panel, an acoustic wave type touch panel, or a combination thereof.

Various structures may be provided on a front surface of the electronic device 300, according various embodiments of the present invention, in detail, around the first display unit 301. For example, a first input unit may be disposed on one side, for example, on a lower side S2 of the first display unit 301. The first input unit may include at least one of a key operated through a physical manipulation and a touch key that generates an input signal only through a contact. A receiver, various sensors, a camera module, and the like may be disposed on another side, for example, on an upper side S1 of the first display unit 301. The receiver may include, for example, a speaker and a vibrator. The sensors may include, for example, the gesture sensor 240A, the proximity sensor 240G, the RGB sensor 240H, the illumination intensity sensor 240K, and the UV sensor 240M, which have been described above.

A separate second input unit may be included along a periphery of the electronic device 300. For example, a power button (PB) for switching on and off all electric power of the combined device 10, or converting the mode of the combined device 10, to which the electric power is applied, into a sleep mode and a driving mode, or a control button (CB) for adjusting volume or adjusting the size of the screen may be provided. An external device connector connected to various external devices may be provided at a predetermined location on a side surface along a periphery of the electronic device 300. For example, an external connection jack, to which an earphone and the like are connected, or an external connector jack for connection of electric power or data may be provided.

Figure 5:
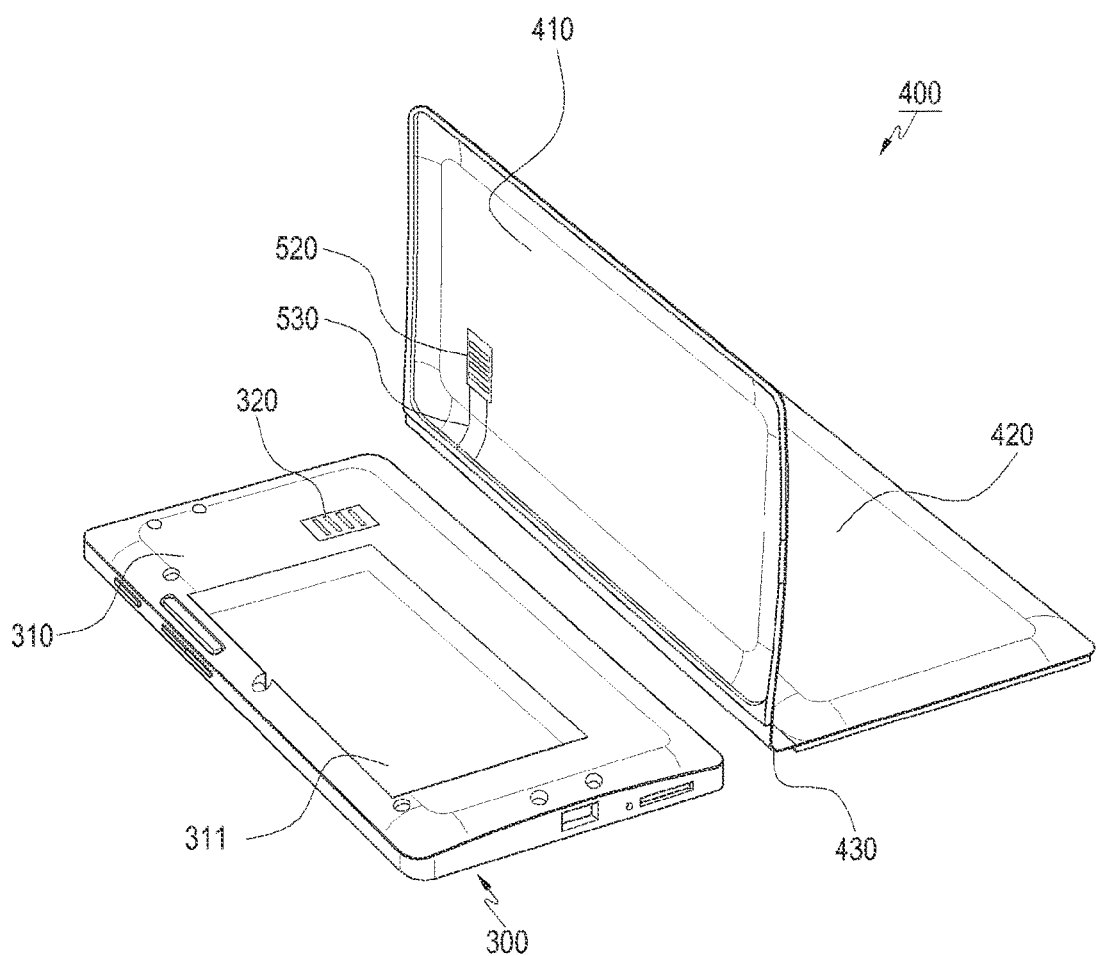
FIG. 5 is a diagram illustrating a rear surface of an electronic device and a cover device separated from the electronic device, according to an embodiment of the present invention.

FIG. 5 is a diagram illustrating a rear surface of an electronic device and a cover device separated from the electronic device, according to an embodiment of the present invention.

Referring to FIG. 5, the rear casing 310 covers a printed circuit board, a bracket, or modules provided within the electronic device 300 and includes the battery mounting space 311 for mounting the battery. The electronic device 300 may be connected to an external or internal charging unit to charge the battery, and the user may replace the mounted battery with another battery. In addition, although not illustrated, an additional battery (for example, an auxiliary battery) may be provided in the electronic device 300. For example, when the additional battery is mounted, the electric power of the electronic device 10 may be maintained while the battery is replaced. Although an example is shown in which the battery may be replaced, the battery may be an embedded battery that cannot be detached from the electronic device 300. That is, when a rear surface 330 is integrally coupled to the electronic 300, the battery located within the electronic device 300 may not be detached from the electronic device 300. In this case, the battery may be charged when an external charging module is connected to the electronic device 300. Although not illustrated, various members, for example, a card mounting part to which a SIM card or a memory card is mounted may be provided on the rear casing 310 of the electronic device 300.

A terminal module 320 is also provided on the rear casing 310 of the electronic device 300 to be exposed such that the terminal module 320 contacts a second connector terminal 520 of a first cover member 410, which is described in greater detail below, to transfer electric power, or is electrically connected to the second connector terminal 520 for transmission and reception of data. When the first cover member 410 is coupled to the rear surface 330 of the electronic device 300, the terminal module 320 may be provided on a surface of the rear surface 330 to be exposed such that the terminal module 320 is electrically connected to the second connector terminal 520 (see FIG. 7). A contact location, a contact configuration, and a contact form of the terminal module 320 and the second connector terminal 520 may be modified and changed according to a form in which the cover 400 covers the electronic device 300, that is, a case in which the first cover member 410 acts as the rear surface 330 of the electronic device 300 and a case in which the first cover member 410 covers the rear surface 330 of the electronic device 300.

Figure 6:
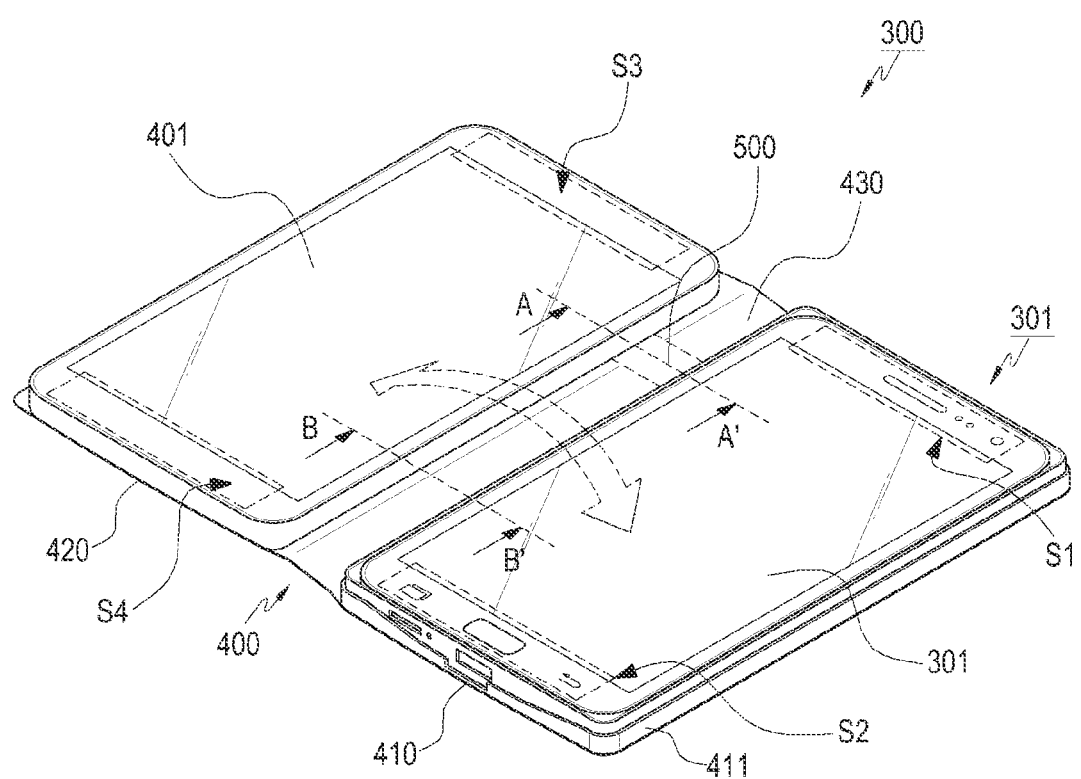
FIG. 6 is a diagram illustrating a front perspective view of a body and a cover device coupled to each other in another form in an electronic device, according to an embodiment of the present invention.
Figure 7:
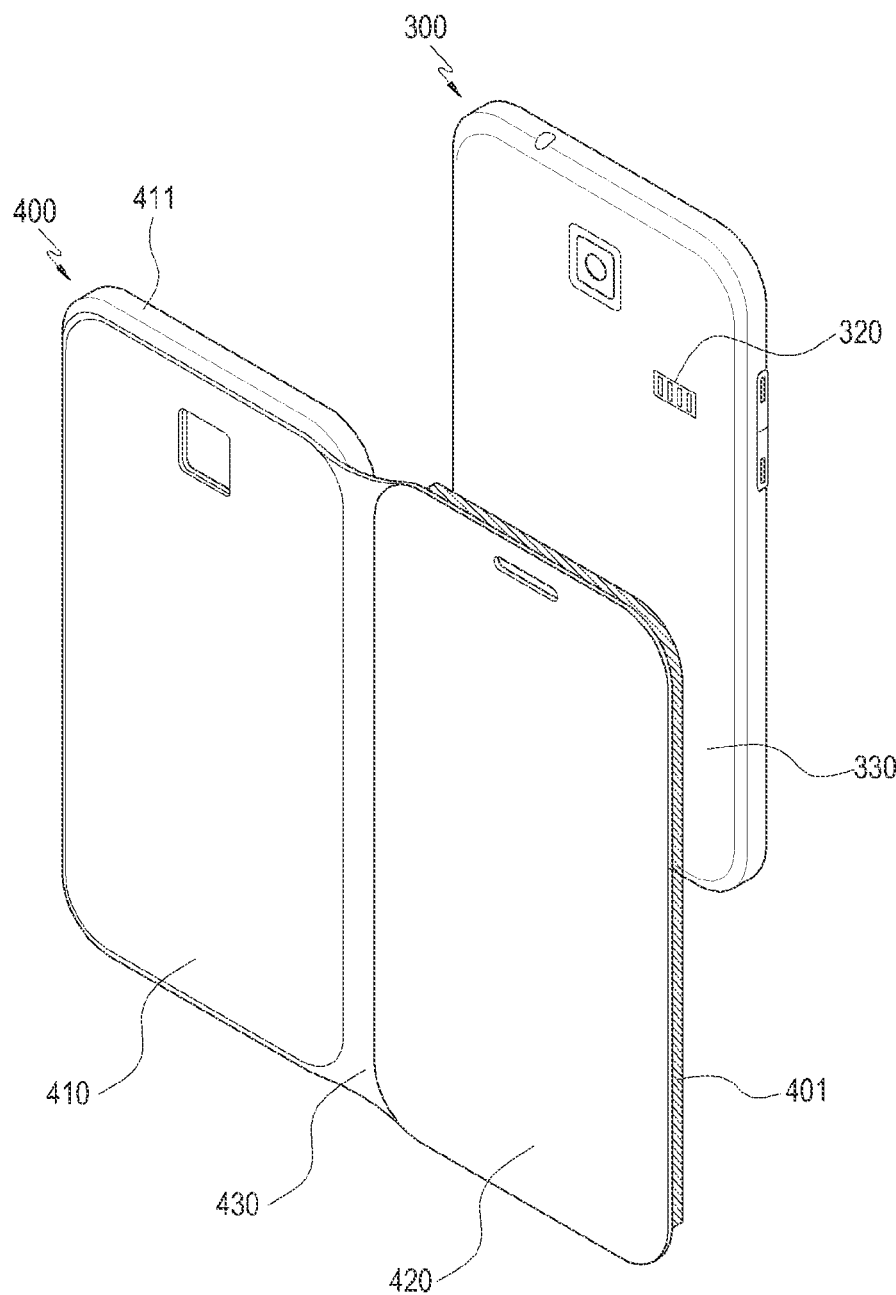
FIG. 7 is a diagram illustrating a rear perspective view of a body and a cover device coupled to each other in another form in an electronic device, according to an embodiment of the present invention.

FIG. 6 is a diagram illustrating a front perspective view of a body and a cover device coupled to each other in another form in an electronic device, according to an embodiment of the present invention. FIG. 7 is a diagram illustrating a rear perspective view of a body and a cover device coupled to each other in another form in an electronic device, according to an embodiment of the present invention.

Referring to FIGS. 6 and 7, the rear surface 310 is covered differently from that of the above-described embodiment. That is, in the prior embodiment, the first cover member 410 is coupled to the electronic device 300 while covering the rear surface 310 of the electronic device 300. However, in this embodiment of the present invention, the rear surface 330 that covers the rear casing 310 may be separately provided on the electronic device 300, and the cover device 400 may be provided to cover the rear surface 330 of the electronic device 300. In addition, the terminal module 320 may be exposed on the rear surface 330 such that an additional display unit 401 of a second cover member 420, which is described in detail below, is electrically connected to the electronic device 300. A separate support member 411 may be provided in the first cover member 410 such that the first cover member 410 is positioned around and coupled to the electronic device 300.

Figure 8:
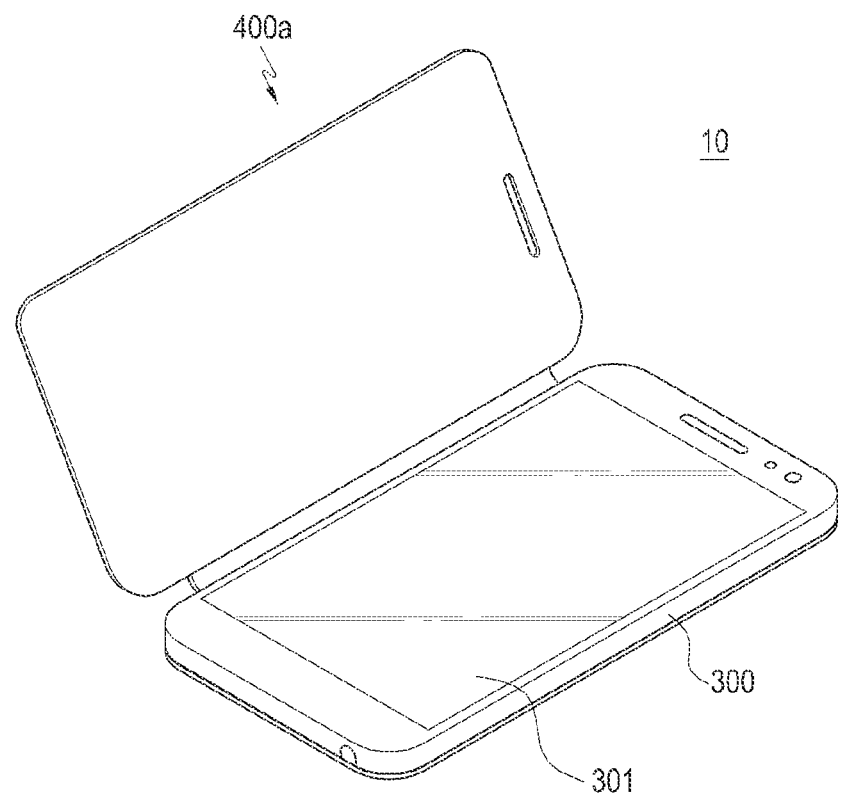
FIG. 8 is a diagram illustrating a state in which a first cover is mounted on an electronic device, according to an embodiment of the present invention.
Figure 9:
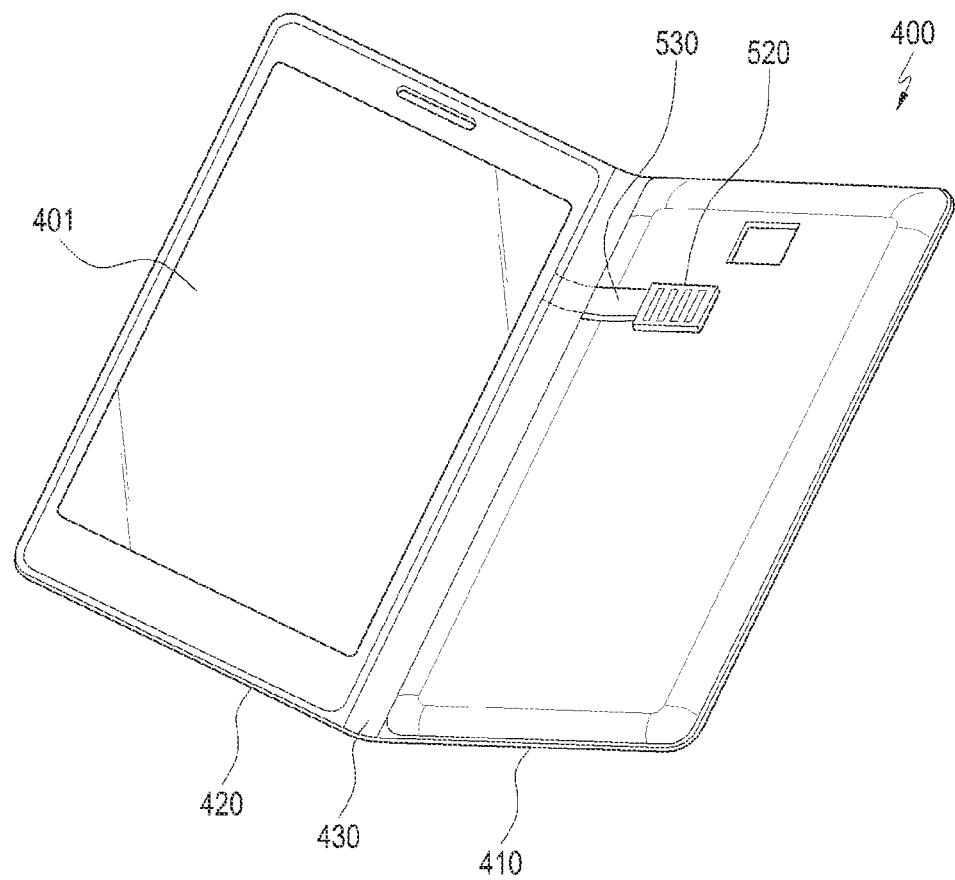
FIG. 9 is a diagram illustrating a second cover in an electronic device, according to an embodiment of the present invention.
Figure 10:
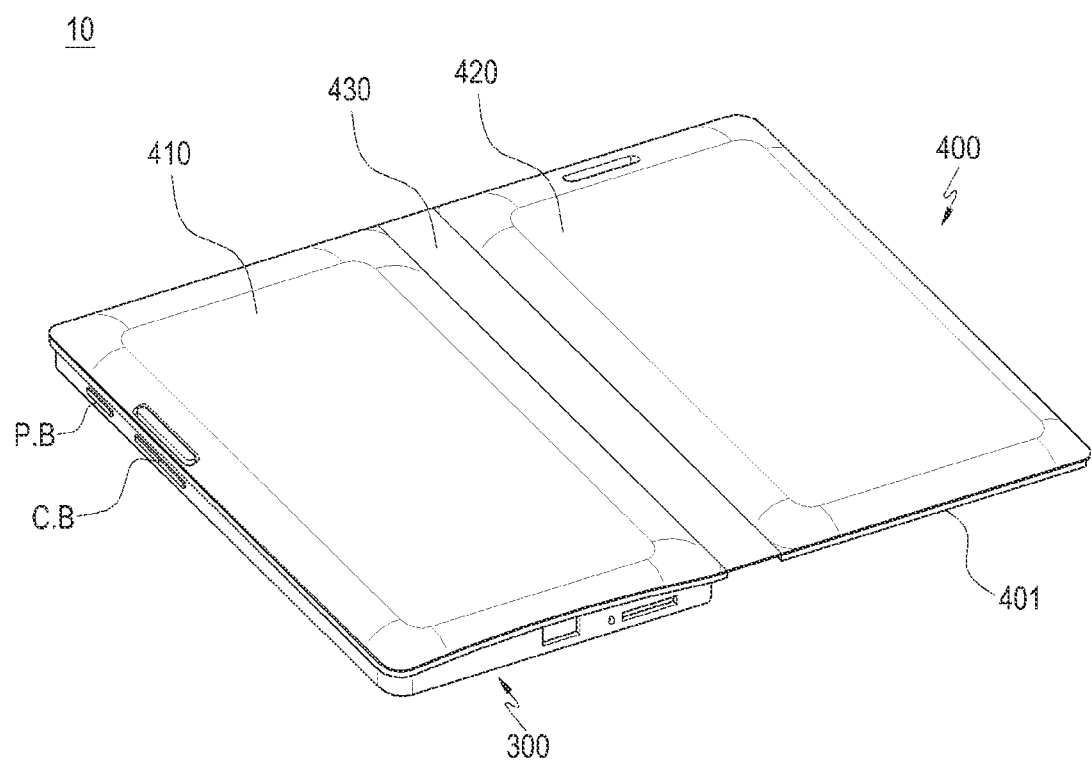
FIG. 10 is a diagram illustrating a perspective view of a second cover in an electronic device from another side, according to an embodiment of the present invention.

FIG. 8 is a diagram illustrating a first cover is mounted on an electronic device, according to an embodiment of the present invention. FIG. 9 is a diagram illustrating a second cover in an electronic device, according to an embodiment of the present invention. FIG. 10 is a diagram illustrating a perspective view of a second cover in an electronic device, according to an embodiment of the present invention.

As shown in FIG. 8, a first cover 400a is coupled to a rear surface of the electronic device 300 to cover the electronic device 300. According to an embodiment of the present invention, the cover is provided in the form of a flip cover. However, the shape of the cover is not limited that which is shown in FIG. 8. For example, the cover may be configured to cover only a rear surface of the electronic device 300. When the first cover 400a of FIG. 8 is coupled to the electronic device 300, no signal is introduced into the terminal module 320 which is exposed on a rear surface of the electronic device 300. Accordingly, the controller 350 may control the electronic device 300 to be driven in a single display driving mode M1 through the first display unit 301a located on a front surface of the electronic device 300.

The cover 400 of FIGS. 9 and 10 may be compatible with the cover 400a of FIG. 8, and may cover the electronic device 300. According to an embodiment of the present invention, the cover 400 is provided in the form of a flip cover.

In detail, the cover 400 includes the first cover member 410, the second cover member 420 to which the second display unit 401 is fixed, and a connection member 430 that connects the second cover member 420 to be rotatable from the first cover member 410. The cover 400 also includes a connection substrate 500 electrically connecting the second display unit 401 to the electronic device 300, and a holder member 600 for holding the second cover member 420 at a predetermined angle from the first cover member 410, such that the second display unit 401 is held at a predetermined distance from the electronic device 300.

First, the first cover member 410 may be coupled to the electronic 300 to cover a rear surface of the body 300, in detail, the rear casing 310 or the rear surface 330 covering the rear case 310 (see FIG. 5). The second connector terminal 520 may be connected to a first connector terminal 510 through a flexible printed circuit 530, which is described in greater detail below. That is, if the cover 400 is mounted to the electronic device 300, the first connector terminal 510 of the second cover member 420 may be electrically connected to the terminal module 320 on a rear surface of the body 300, and accordingly, the second display unit 401 may be electrically connected to the electronic device 300.

The second cover member 420 may be provided to open and close over the first display unit 301 provided on a front surface of the electronic device 300. The second display unit 401 may be fixed to an inner surface of the second cover member 420 facing the first display unit 301 while being attached to the inner surface of the second cover member 420, forming a single piece with the second cover member 420 (here, the single piece refers to a configuration in which one body is fixed to another body such that the two bodies are not easily separated from each other as if they were a single piece). The second display unit 401 has a configuration that may be electrically connected to the electronic device 300 when the cover 400 is electrically connected to the electronic device 300 through the connection substrate 500, which is described in greater detail below, when the cover 400 is mounted on the electronic device 300.

When the second cover member 420 is opened from the first cover member 410 coupled to a rear surface of the electronic device 300, it may open and close the first display unit 301 and may open and close the second display unit 401 facing the first display unit 301 while also contacting the first display unit 301.

The second display unit 401 may include a configuration that is the same as or similar to the display unit described above with reference to FIGS. 1 and 2.

In an embodiment of the present invention, the touch panel of the second display unit 401 may be a capacitive touch panel, an electromagnetic resonance type touch panel, a resistive touch panel, an infrared touch panel, an electromagnetic induction type touch panel or an acoustic wave type touch panel, or a combination thereof.

A body for attaching and fixing the second display unit 401 to an inner surface of the second cover member 420 to support the second cover member 420 may be provided on the periphery of the second display unit 401, according to an embodiment of the present invention.

The second display unit 401 may be utilized as a main display unit of the combined device 10 or a sub-display unit according to settings of a user environment of the combined device 10 by the user, and may be utilized as a main display unit based on two different user environments.

Various structures may be provided at a periphery of the second display unit 401. For example, a third input unit may be disposed on one side, for example, on a lower side S4 of the second display unit 401. The third input unit may include at least one of a key operated through a physical manipulation and a touch key that generates an input signal only through a contact. A receiver, various sensors, a camera module, and the like may be disposed on another side, for example, on an upper side S3 of the second display unit 401. The receiver may include, for example, a speaker and a vibrator. The sensors may include, for example, the gesture sensor 240A, the proximity sensor 240G, the RGB sensor 240H, the illumination intensity sensor 240K, and the UV sensor 240M, as described above. Only an input using a touch panel and an output of an image using a display panel may be implemented instead of providing a separate structure at a periphery of the second display unit 401. This structure may be freely modified and changed according to an in-use environment of the second display unit 401.

Although it has been described above that the second display unit 401 is switched on for electrical connection as the second cover 400 is mounted on the body 300, the present disclosure is not limited thereto.

For example, a power button for switching on and off electric power of the second display unit 401, or for converting the mode of the electronic device 10, to which electric power is applied, into a sleep mode and a driving mode may be provided on the periphery of the second display unit 401, and a control button for adjusting volume and adjusting the size of the screen in the second display unit 401 may be provided.

Various input and output units such as a setting button, an input button, and a control button of the second display unit 401 may be freely changed and modified. For example, the second display unit 401 may be set to be driven through a power input unit provided in the first display unit 301 and a control input unit of a side surface of the first display unit 301.

Figure 11:
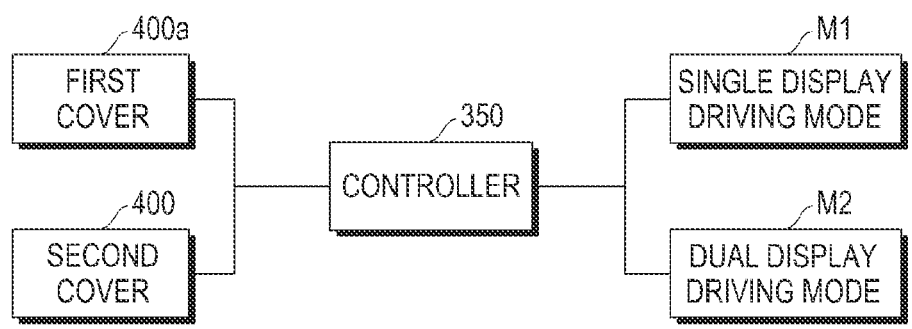
FIG. 11 is a block diagram illustrating an electronic device, according to an embodiment of the present invention.

FIG. 11 is a block diagram illustrating an electronic device, according to an embodiment of the present invention.

Referring to FIG. 11, as described above, the first display unit 301 and the second display unit 401 may allow inputs and outputs according to different user environments, and the first and second display units 301 and 401 may output screens associated with each other. That is, the controller 350 controls the combined device 10 to be driven in the dual display driving mode M2 when the cover 400 is coupled. In particular, the first display unit 301 may be driven in a first mode and the second display unit 401 may be driven in a second mode according to settings of the user. The first display unit 301 may be executed in a first mode corresponding to a multimedia function such as videos, and the second display unit 401 may be implemented in a second mode corresponding to a game, another multimedia function, the Internet, or a screen according to transmission and reception of data. If the electronic device 300 is held on a plane such as a table, the second display unit 401 may be disposed to be inclined with respect to the first display unit 301. In this case, when the user executes a user environment for writing a document, the first display unit 301 may be driven in a first mode for implementing an input according to a touch when an input unit, such as QWERTY, is displayed on the first display unit 301, and the second display unit 401 may be implemented in a second mode to output an input through the first display unit 301. A video may be reproduced through the held second display unit 401. The dual display mode of the first display unit 301 and the second display unit 401 may be freely variously utilized according to a user environment or settings.

Figure 12:
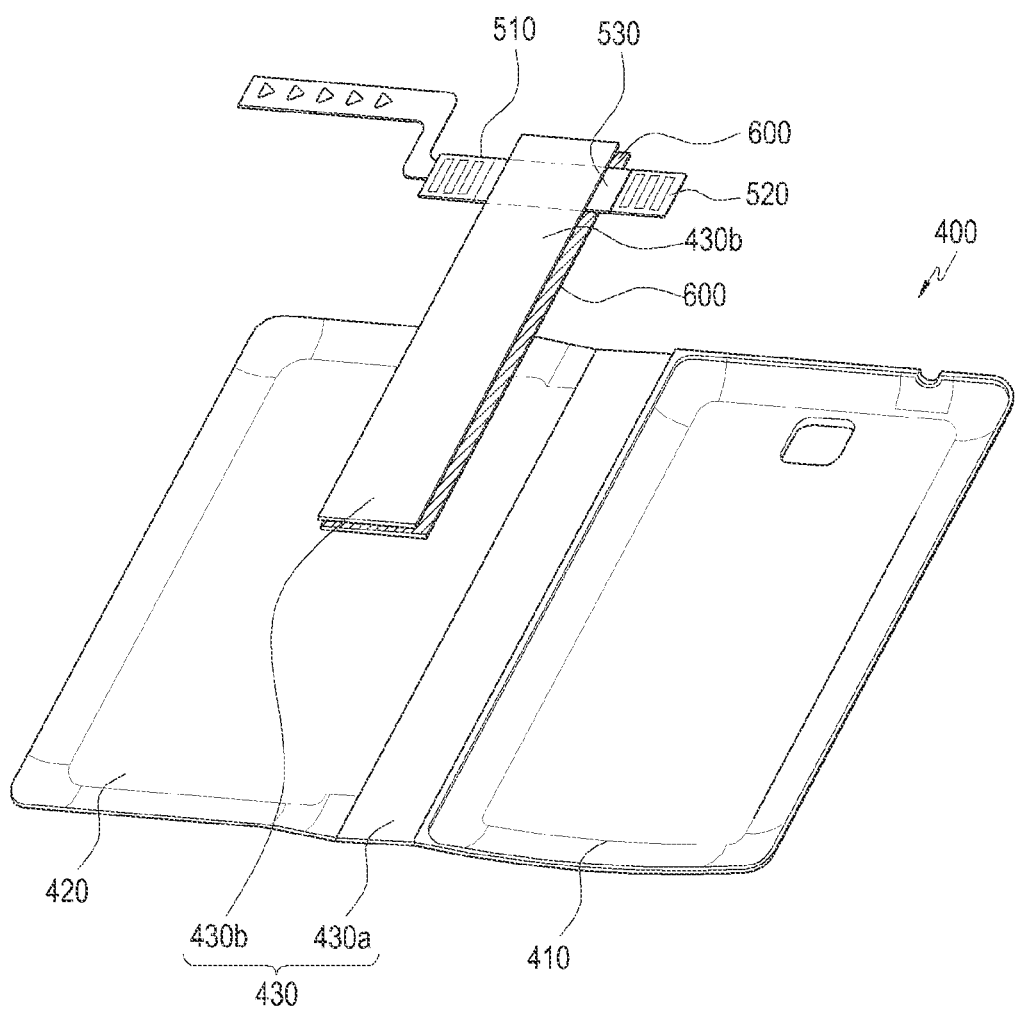
FIG. 12 is a diagram illustrating an exploded perspective view of a cover device in an electronic device, according to an embodiment of the present invention.
Figure 13:
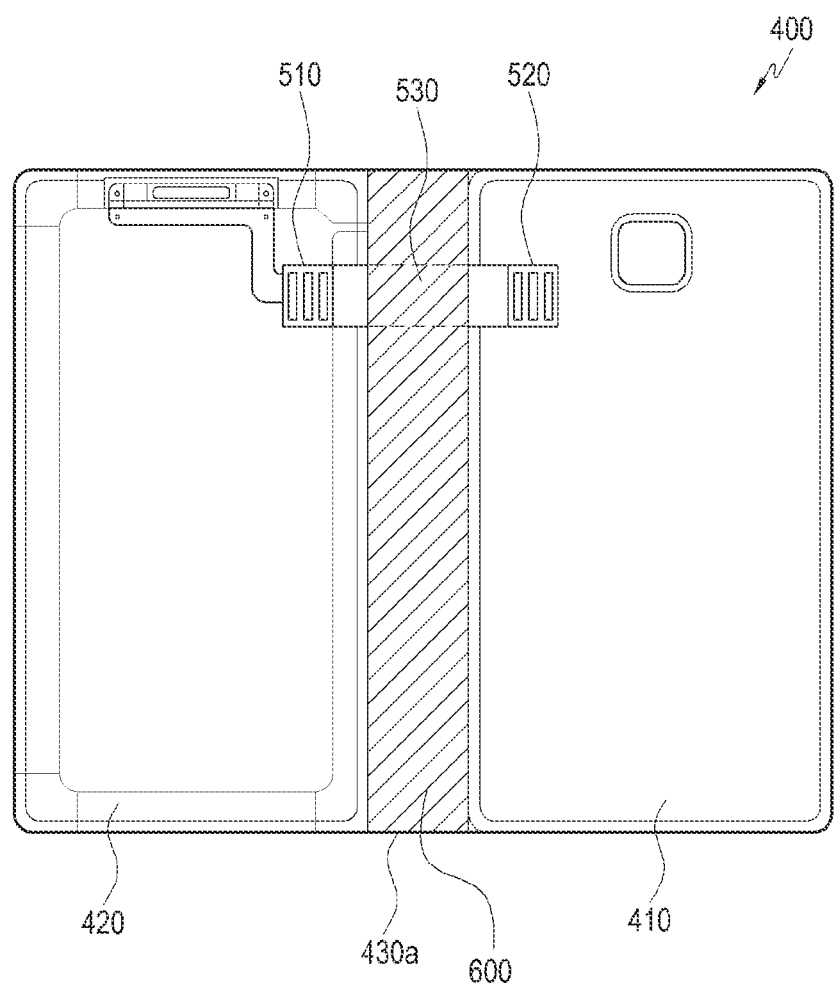
FIG. 13 is a diagram illustrating a cover device in an electronic device, according to an embodiment of the present invention.
Figure 14A:
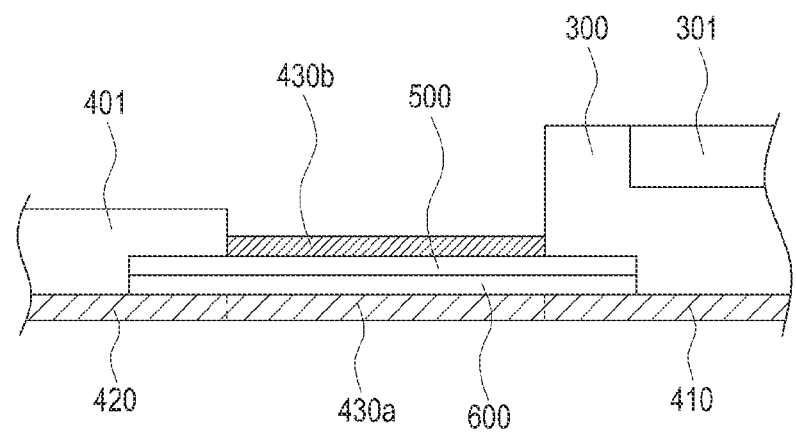
FIGS. 14A and 14B are diagrams illustrating sectional views taken along line A-A' and line B-B' of FIG. 6, according to an embodiment of the present invention.
Figure 14B:
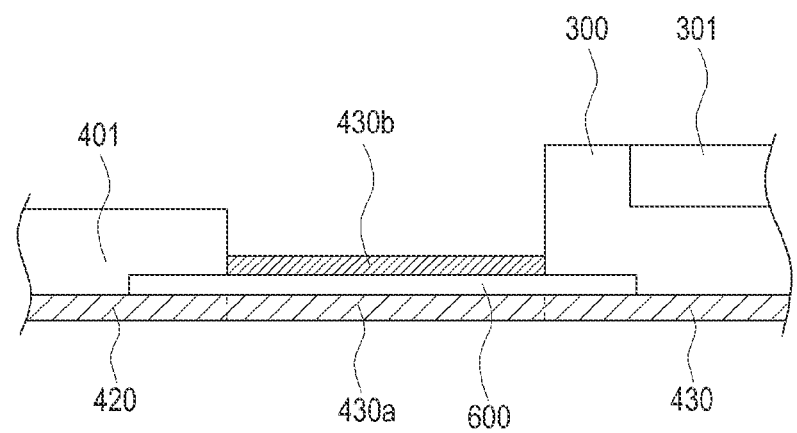

FIG. 12 is a diagram illustrating an exploded perspective view of a cover device in an electronic device, according to an embodiment of the present invention. FIG. 13 is a diagram illustrating a cover device in an electronic device, according to an embodiment of the present invention. FIGS. 14A and 14B are diagrams illustrating sectional views taken along line A-A' and line B-B' of FIG. 6, according to an embodiment of the present invention.

Referring to FIGS. 12 to 14B, a connection member 430 is provided to connect one surface of the first cover member 410 coupled to a rear surface of the electronic device 300 and one surface of the second cover member 420 covering a front surface of the electronic device 300. The connection member 430 may connect the second cover member 420 such that the second cover member 420 opens from and closes on the first cover member 410.

The connection member 430 may be formed of a flexible material to be rotated while connecting the first cover member 410 and the second cover member 420. The flexible material is a material, of which a shape may be flexibly deformed, and may include, for example, a fiber and a natural or artificial leather material. The connection member 430 includes an outer member 430a connected to the first cover member 410 and the second cover member 420, and an inner member 430b mounted on an inner surface of the outer member 430a and jointed to the outer member 430a while facing the outer member 430a, to cover the connection substrate 500 disposed between the second display unit 401 stacked on the inner surface of the outer member 430a and the body 300 and a holder member 600 for holding the second display unit 401 in the electronic device 300, as shown in FIGS. 12 and 13.

That is, the holder member 600 and the connection substrate 500 are stacked between the outer member 430a and the inner member 430b. When the connection substrate 500 is disposed a location of the connection member 430, the outer member 430a, the holder member 600, the connection substrate 500, and the inner member 430b may be sequentially stacked, as shown in FIG. 14A. The outer member 430a, the holder member 600, and the inner member 430 may be sequentially stacked at a part of the connection member 430 where the connection substrate 500 is not provided, as shown in FIG. 14B.

The connection substrate 500 is a configuration that electrically connects the electronic device 300 mounted on the first cover member 410 and the second display unit 401 fixed to the second cover member 420, and one or more connection substrates may be provided. The connection substrate 500 is formed by using a flexible printed circuit board, and may be flexibly deformed together with the connection member 430. The connection substrate 500 may be hidden by the inner member 430b, and may also be hidden by the second display unit 401 and the electronic device 300.

The connection substrate 500 includes a first connector terminal 510, a second connector terminal 520, and the flexible circuit board 530.

The first connector terminal 510 is located and mounted on an inner surface of the second cover member 420, and may be electrically connected to the second display unit 401 when the second display unit 401 is attached and fixed to the inner surface of the second cover member 420. When the second display unit 401 is attached to the second cover member 420, the first connector terminal 510 is covered by the second display unit 401.

The second connector terminal 520 is located and mounted on an inner surface of the first cover member 410, and if the cover 400 is positioned on the electronic device 300, it may be electrically connected to the terminal module 320 mounted to a rear surface of the electronic device 300 while contacting the terminal module 320. The second connector terminal 520 is covered by the electronic device 300 when the first cover member 410 is coupled to a rear surface of the electronic device 300 after being exposed at an inner surface of the first cover member 410.

The flexible circuit board 530 is configured to connect the first connector terminal 510 and the second connector terminal 520, and may be provided in the first cover member 410 and the second cover member 420 via the connection member 430. The flexible circuit board 530 may be flexible such that the shape thereof may be varied as the connection member 430 is rotated. In particular, the flexible circuit board 530 may be stacked between the outer member 430a and the inner member 430b to be covered by the inner member 430b, and opposite ends of the inner member 430b may be covered as the second display unit 401 and the body 300 are mounted.

According to an embodiment of the present invention, the cover 400 includes a holder member 600, such that the second display unit 401 is held at one or more angles. In detail, the holder member 600 is configured to hold the second display unit 401 such that the second display unit 401 is inclined from the first display unit 301 at one or more angles while the first display unit 301 is exposed to an upper surface of the body 300. The holder member 600 may be mounted on the connection member 430, and may be formed of a shape memory material such as a shape memory alloy or a shape keeping plastic.

The first cover member 410 and the second cover member 420 may further include a fixing member 700 such that the first display unit 301 and the second display unit 401 are fixed to each other while being folded, or the first display unit 301 and the second display unit 401 are fixed while standing with their backs toward each other as the second cover member 420 is rotated from the first cover member 410 by about 360°.

The fixing member 700 may include a first magnet member 710 provided in the first cover member 410, and a second magnet member 720 provided in the second cover member 420. Accordingly, the first cover member 410 and the second cover member 420 may be fixed to each other using the force between the first magnet member 710 and the second magnet member 720, in the state in which the first display unit 301 and the second display unit 401 are folded.

In addition, the first magnet member 710 and the second magnet member 720 may be fixed to each other while being rotated by 360° using a force in the state in which the first display unit 301 and the second display unit 401 with their backs toward each other.

Figure 15:
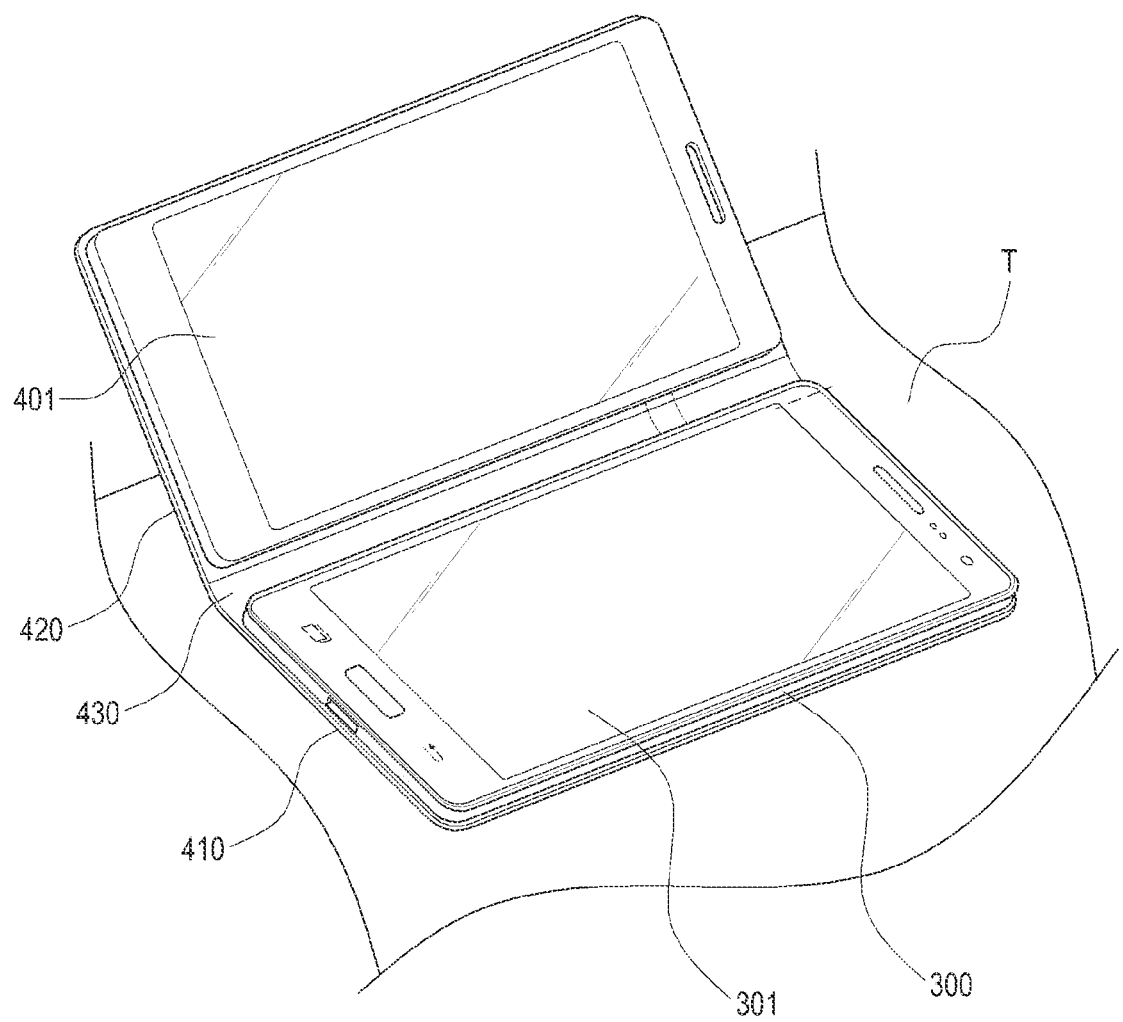
FIG. 15 is a diagram illustrating a second cover member held in a first cover member in an electronic device, according to an embodiment of the present invention.

FIG. 15 is a diagram illustrating a second cover member held with a first cover member in an electronic device, according to an embodiment of the present invention.

When the first cover 400a is coupled to the electronic device 300, no signal is applied to the terminal module 320 located on a rear surface of the electronic device 300. Accordingly, the controller 350 may control the mode into the single display driving mode M1 such that inputs and outputs may be implemented through the first display unit 301 mounted on a front surface of the electronic device 300. Accordingly, the electronic device 300 provided with the first cover 400a may be driven in the single display driving mode M1.

Alternatively, when the cover 400 may be mounted on the electronic device 300, the second display unit 401 is fixed to an inner surface of the second cover member 420. Accordingly, if the second cover 400 is mounted on the electronic device 300, the second connector terminal 520 exposed at the inner surface of the first cover member 410 may be coupled to the terminal module 320 exposed on the rear surface of the body 300 while contacting the terminal module 320. When the terminal module 320 and the second connector terminal 520 are connected to each other while contacting each other, a signal corresponding to a contact between the terminal module 320 and the second connector terminal 520 may be applied to the controller 350 and electric power may be supplied to the second display unit 401.

The controller 350, to which a contact signal of the second connector terminal 520 is applied through the terminal module 320, may make a control such that the electronic device 300 is executed in the dual display driving mode M2 for implementing inputs and outputs through the first display unit 301 and the second display unit 401.

The second display unit 401 may receive electric power through the electronic device 300 and may be switched on as it is electrically connected to the electronic device 300 through the connection substrate 500.

When a power button for switching on and off electric power of the second display unit 401 is separately provided, driving of the second display unit 401 may be switched on and off according to selection of the user through the power button of the second display unit 401.

The first display unit 301 and the second display unit 401 may be variously utilized while being unfolded. The first display unit 301 and the second display unit 401 may display different images according to settings of the user environment, and may display associated images.

Although it has been exemplified in the embodiments herein that the second cover member is rotated to the left side of the electronic device 300 to be unfolded, the unfolding direction of the second cover member 420 may be variously implemented according to a fixed location of the connection member. It is apparent that the direction in which the second cover member 420, for example, the second display unit 401, is unfolded with respect to the electronic device 300, for example, the first display unit 301, may be suitably designed by those skilled in the art in consideration of a purpose or an in-use environment of the combined device 10.

In addition, although it has been exemplified in the embodiments herein that the connection member may be manufactured of natural leather or synthetic leather, the connection member also may be manufactured of a flexible polymer resin, such as silicon or rubber.

Furthermore, although it has been exemplified in the embodiments herein that various input units and various sensors may be disposed around the first and second display units, their locations may be variously modified, and the first and second display units may directly implement in an input unit (for example, a touch screen).

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A cover device comprising:
a first cover member detachably coupled to a body of an electronic device;
a second cover member pivotally connected to the first cover member and having a display unit on an inner surface thereof; and
a connection member pivotally connecting the first cover member and the second cover member, and having a connection substrate electrically connecting the electronic device and the display unit,
wherein the connection substrate comprises:
a first connector terminal located in the second cover member and electrically connected to the display unit;
a second connector terminal located in the first cover member and electrically connected to a terminal module of the body according to a coupling of the first cover member to the body; and
a flexible circuit board connecting the first connector terminal and the second connector terminal.

2. The cover device of claim 1, wherein the connection member comprises a holder member for holding the first cover member at an inclined position with respect to the second cover member.

3. The cover device of claim 2, wherein the holder member comprises a shape memory member having one or more holding angles.

4. The cover device of claim 3, wherein the shape memory member is formed of a shape memory alloy or a shape keeping plastic.

5. The cover device of claim 2, wherein the connection member is formed of a flexible material, and wherein the connection member comprises:
an outer member connecting the first cover member and the second cover member; and
an inner member mounted on an inner surface of the outer member, and covering the holder member or the connection substrate between the display unit and the body of the electronic device.

6. The cover device of claim 1, wherein the display unit is a flexible display.

7. The cover device of claim 1, wherein the display unit comprises at least one of a Liquid Crystal Display (LCD), a Light Emitting Display (LED), an Organic Light Emitting Diode Display (OLED), and an Active Mode Organic Light Emitting Diode Display (AMOLED).

8. A cover device comprising:
a first cover member detachably provided on a first surface of a body of an electronic device;
a second cover member pivotally connected to the first cover member, having a display unit fixed to and integrated with an inner surface thereof, and configured to removably cover a main display unit of the body of the electronic device;
a connection member connecting the first cover member and the second cover member such that the second cover member is pivotable about the first cover member, and on which a connection substrate electrically connecting the display unit to the electronic device is mounted; and
a shape memory member mounted on the connection member, for holding the first cover member at an inclined position with respect to the second cover member,
wherein the connection substrate comprises:
a first connector terminal located in the second cover member and electrically connected to the display unit;
a second connector terminal located in the first cover member and electrically connected to a terminal module of the body according to a coupling of the first cover member to the body; and
a flexible circuit board connecting the first connector terminal and the second connector terminal.

9. An electronic device comprising:
a body comprising a first display unit;
a cover device comprising a first cover member detachably coupled to the body, and a second cover member pivotable about the first cover member, wherein a second display unit is fixed to and integrated with an inner surface of the second cover member; and
a connection member connecting the first cover member and the second cover member,
wherein a connection substrate electrically connecting the second display unit and the body are mounted on the first cover member and the second cover member via the connection member,
wherein the second display unit is electrically connected to the body when the first cover member is coupled to the body, and
wherein the connection substrate comprises:
a first connector terminal located in the second cover member and electrically connected to the second display unit;
a second connector terminal located in the first cover member and electrically connected to a terminal module of the body according to a coupling of the first cover member to the body; and
a flexible circuit board connecting the first connector terminal and the second connector terminal.

10. The electronic device of claim 9, wherein the connection member comprises a holder member for holding the second cover member in an inclined position with respect to the first cover member.

11. The electronic device of claim 10, wherein the holder member comprises a shape memory member or a shape keeping plastic.

12. The electronic device of claim 10, wherein the connection member is formed of a flexible material, and wherein the connection member comprises:
   an outer member connecting the first cover member and the second cover member; and
   an inner member mounted on an inner surface of the outer member between the second display unit and the body.

13. The electronic device of claim 12, wherein the outer member, the holder member, and the inner member are sequentially stacked, or the outer member, the holder member, the connection substrate, and the inner member are sequentially stacked, according to a location of the connection member.

14. The electronic device of claim 9, wherein the second display unit comprises a flexible display member.

15. The electronic device of claim 9, wherein the first display unit or the second display unit comprises at least one of a Liquid Crystal Display (LCD), a Light Emitting Display (LED), an Organic Light Emitting Diode Display (OLED), and an Active Mode Organic Light Emitting Diode Display (AMOLED).

16. The electronic device of claim 15, wherein the first display unit and the second display unit have the same or different structures.

17. The electronic device of claim 9, further comprising a fixing member, provided in the first cover member and the second cover member, for fixing a position of the first cover member and the second cover member while the first cover member directly faces the second cover member or faces the second cover member after being rotated.

18. The electronic device of claim 17, wherein the fixing member comprises first and second magnet members mounted to the first and second cover members, respectively.

19. The electronic device of claim 9, wherein the first cover member acts as a rear cover that covers a rear case of the body.

20. The electronic device of claim 9, wherein a rear cover covering a rear case of the body is provided on a rear surface of the body, and the first cover member comprises a support member that covers the rear cover and supports a periphery of the body while surrounding the periphery of the body.

21. The electronic device of claim 9, wherein the first display unit and the second display unit display different user environments.

22. An electronic device comprising:
   a body having a first display unit on a first surface thereof;
   a first cover device coupled to a second surface of the body, for covering the body; and
   a second cover device being compatible with the first cover device, for covering the body of the electronic device,
   wherein the second cover device comprises:
      a first cover member detachably coupled to the second surface of the body;
      a second cover member pivotally coupled to the first cover member, for opening and closing the second cover device over the first surface of the body, wherein a second display unit is integrally fixed to an inner surface of the second cover member; and
      a connection member pivotally connecting the first cover member and the second cover member,
   wherein the second cover device comprises a connection substrate electrically connecting the second display unit and the body, and the connection substrate is mounted to the first cover member and the second cover member via the connection member, and
   wherein the connection substrate comprises:
      a first connector terminal disposed on the second cover member and electrically connected to the second display unit;
      a second connector terminal disposed on the first cover member and electrically connected to a terminal module exposed on the second surface of the body based on a coupling of the first cover member to the body; and
      a flexible circuit board connecting the first connector terminal and the second connector terminal.

23. The electronic device of claim 22, wherein the body further comprises a controller for controlling a mode of the electronic device as a single display driving mode and a dual display driving mode based on whether the first cover device and the second cover device are coupled to the body.

24. The electronic device of claim 23, wherein the controller controls the electronic device to execute in the single display driving mode through driving of the first display unit if the first cover device is coupled to the body, and the controller controls the electronic device to execute in the dual display driving mode through driving of the first display unit and the second display unit if the second cover device is coupled to the body.

25. The electronic device of claim 24, wherein the first display unit and the second display unit are executed in different user environments.

26. The electronic device of claim 22, wherein the connection member comprises a shape memory member or a shape keeping plastic that retains a holding angle such that the second cover member is inclined with respect the first cover member.

* * * * *